US012654618B2

(12) United States Patent
    Jia et al.

(10) Patent No.: US 12,654,618 B2
(45) Date of Patent: Jun. 16, 2026

(54) CONTROLLER SYSTEM AND CONTROL METHOD

(71) Applicant: Yinwang Intelligent Technologies Co., Ltd., Shenzhen (CN)

(72) Inventors: Xiaolin Jia, Hangzhou (CN); Xiubo Chen, Dongguan (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 273 days.

(21) Appl. No.: 18/372,456

(22) Filed: Sep. 25, 2023

(65) Prior Publication Data

US 2024/0010129 A1     Jan. 11, 2024

Related U.S. Application Data

(63) Continuation of application No. PCT/CN2022/083102, filed on Mar. 25, 2022.

(30) Foreign Application Priority Data

Mar. 26, 2021   (CN) ......................... 202110328114.9
Jan. 30, 2022   (CN) ......................... 202210114409.0

(51) Int. Cl.
    *B60R 1/20*       (2022.01)
    *B60W 50/00*      (2006.01)
    *B60W 50/14*      (2020.01)

(52) U.S. Cl.
    CPC ........... *B60R 1/20* (2022.01); *B60W 50/0098* (2013.01); *B60W 50/14* (2013.01);
    (Continued)

(58) Field of Classification Search
    CPC ............... B60R 1/20; B60R 2300/102; B60W 50/0098; B60W 50/14; B60W 2554/4029;
    (Continued)

(56) References Cited

U.S. PATENT DOCUMENTS 11,027,656  B1    6/2021  Sagar et al.
2018/0367731  A1   12/2018  Gatti et al.
(Continued)

FOREIGN PATENT DOCUMENTS

CN       106527428  A      3/2017
CN       209683619  U      11/2019
(Continued)

*Primary Examiner* — Lin Ye
*Assistant Examiner* — Fayez A Bhuiyan
(74) *Attorney, Agent, or Firm* — WOMBLE BOND DICKINSON (US) LLP

(57)              ABSTRACT

This application relates to the field of intelligent vehicle technologies in the field of artificial intelligence technologies, and in particular, to a controller system. The controller system includes: an intelligent driving domain control unit; a human-machine interaction domain control unit; and a sensor interface unit that is connected to the intelligent driving domain control unit and the human-machine interaction domain control unit. The sensor interface unit is connected to a sensor, and transmit data of the sensor to the intelligent driving domain control unit and the human-machine interaction domain control unit. In this application, external cable connections can be simplified, occupation of data stream transfer resources can be reduced, and power consumption of a vehicle can be reduced.

20 Claims, 11 Drawing Sheets

(52) U.S. Cl.
CPC .. *B60R 2300/102* (2013.01); *B60W 2050/143* (2013.01); *B60W 2050/146* (2013.01); *B60W 2420/403* (2013.01); *B60W 2554/4029* (2020.02)

(58) Field of Classification Search
CPC ..... B60W 2050/143; B60W 2050/146; B60W 2420/403
See application file for complete search history.

(56) References Cited

U.S. PATENT DOCUMENTS

| | | | | |
|---|---|---|---|---|
| 2021/0190923 A1* | 6/2021 | Golomedov | .......... | G01S 17/931 |
| 2022/0032904 A1 | 2/2022 | Lee et al. | | |

FOREIGN PATENT DOCUMENTS

| | | | |
|---|---|---|---|
| CN | 110803009 | A | 2/2020 |
| CN | 113156916 | A | 7/2021 |
| EP | 2466889 | A2 | 6/2012 |
| JP | 2005167528 | A | 6/2005 |
| JP | 2009122946 | A | 6/2009 |
| JP | 2010183170 | A | 8/2010 |
| JP | 2013003779 | A | 1/2013 |
| JP | 2019158762 | A | 9/2019 |
| JP | 2020166689 | A | 10/2020 |
| JP | 2021043688 | A | 3/2021 |
| KR | 101772929 | B1 | 9/2017 |
| KR | 20170108239 | A | 9/2017 |
| WO | 2018105027 | A1 | 6/2018 |
| WO | 2019089132 | A1 | 5/2019 |
| WO | 2019160569 | A1 | 8/2019 |

* cited by examiner

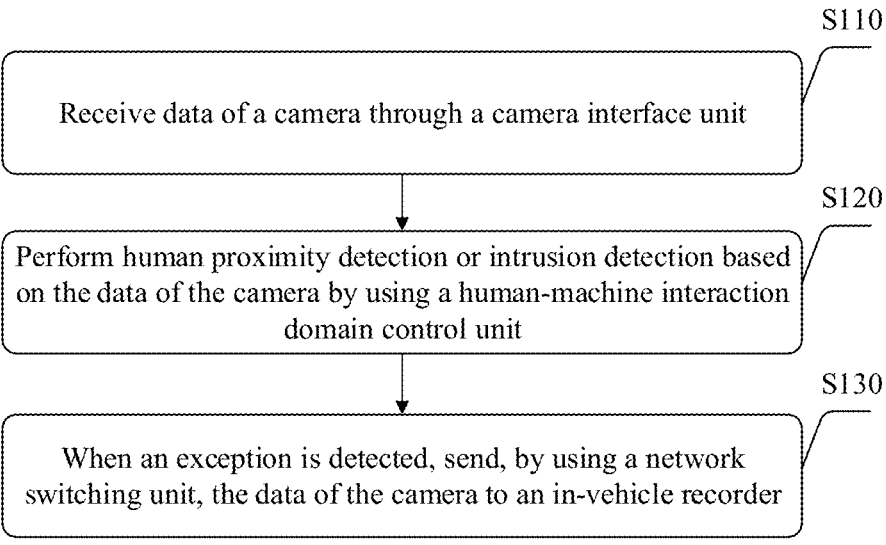

S110

Receive data of a camera through a camera interface unit

S120

Perform human proximity detection or intrusion detection based on the data of the camera by using a human-machine interaction domain control unit

S130

When an exception is detected, send, by using a network switching unit, the data of the camera to an in-vehicle recorder

FIG. 8

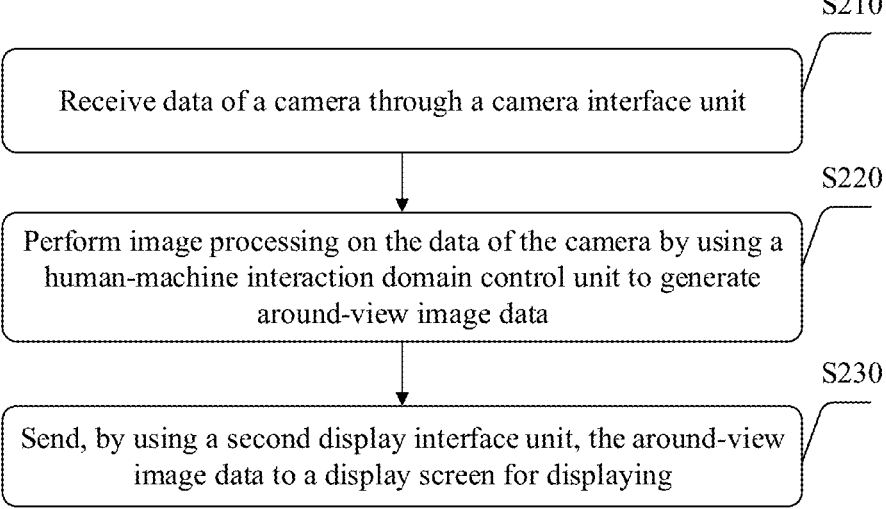

S210

Receive data of a camera through a camera interface unit

S220

Perform image processing on the data of the camera by using a human-machine interaction domain control unit to generate around-view image data

S230

Send, by using a second display interface unit, the around-view image data to a display screen for displaying

FIG. 9

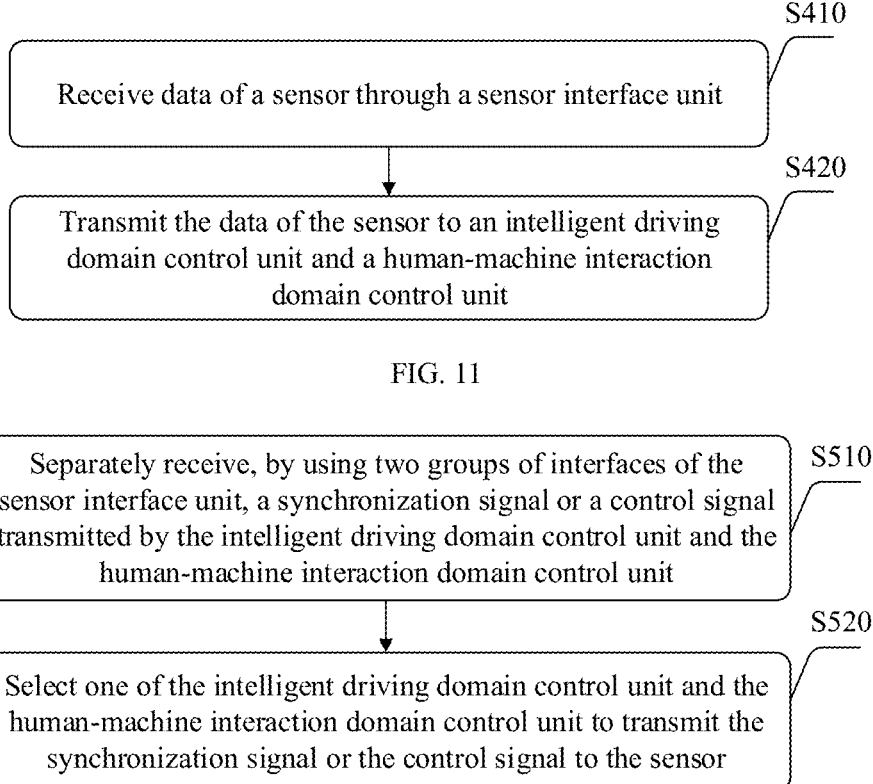

S410

Receive data of a sensor through a sensor interface unit

S420

Transmit the data of the sensor to an intelligent driving
domain control unit and a human-machine interaction
domain control unit

Separately receive, by using two groups of interfaces of the
sensor interface unit, a synchronization signal or a control signal
transmitted by the intelligent driving domain control unit and the
human-machine interaction domain control unit

S520

Select one of the intelligent driving domain control unit and the
human-machine interaction domain control unit to transmit the
synchronization signal or the control signal to the sensor

FIG. 12

CONTROLLER SYSTEM AND CONTROL METHOD

CROSS-REFERENCE TO RELATED APPLICATIONS

This application is a continuation of International Patent Application No. PCT/CN2022/083102, filed on Mar. 25, 2022, which claims priority to Chinese Patent Application No. 202110328114.9, filed on Mar. 26, 2021 and Chinese Patent Application No. 202210114409.0, filed on Jan. 30, 2022. All of the aforementioned applications are hereby incorporated by reference in their entireties.

TECHNICAL FIELD

The present application relates to the field of intelligent vehicle technologies, and in particular, to a controller system, a vehicle control system, a data processing method, a control method, and a system startup method.

BACKGROUND

Intelligent driving is a key technology for implementing intelligent vehicles and intelligent transportation, and is an inevitable trend of future vehicle development. According to prediction of the Institute of Electrical and Electronics Engineers, 75% of new vehicles will provide intelligent driving functions in 2040. From the perspective of technology, intelligent driving brings revolutionary challenges and opportunities in the automobile industry, and can improve driving safety, avoid congestion, improve energy efficiency, and improve city operation efficiency. From the perspective of industry development, integrated with the Internet of Things, cloud computing, and artificial intelligence (AI), intelligent driving will become an important engine for development of many industries in the future, and will drive rapid development of intelligent manufacturing and next-generation information technologies.

An intelligent driving system of a vehicle obtains information about the vehicle and information around the vehicle by using sensors such as a camera, a radar, and a laser radar, and analyzes and processes the obtained information, to implement functions such as obstacle sensing, target recognition, vehicle positioning, route planning, and driver monitoring/reminding, to improve driving safety, automation, and comfort of the vehicle.

As demands of intelligence on electronic functions of vehicles increase, electrical and/or electronic (electrical and/or electronic, E/E) architectures of vehicles gradually evolve from distributed architectures to centralized architectures. To obtain abundant information, a quantity and types of sensors disposed on a vehicle also increase. These sensors are connected to the vehicle to provide data, which is required to be considered in design.

SUMMARY

This application provides a controller system, a vehicle control system, a data processing method, a control method, and a system startup method, to simplify external cable connections, reduce occupation of data stream transfer resources, and reduce power consumption of a vehicle.

To achieve the foregoing objectives, a first aspect of this application provides a controller system. The controller system includes:

an intelligent driving domain control unit;

a human-machine interaction domain control unit; and a sensor interface unit, connected to the intelligent driving domain control unit and the human-machine interaction domain control unit, where the sensor interface unit is connected to a sensor, and is configured to transmit data of the sensor to the intelligent driving domain control unit and the human-machine interaction domain control unit.

In this way, in the system of this structure, sensor data can be replicated to the intelligent driving domain control unit and the human-machine interaction domain control unit module while being transferred by the intelligent driving domain control unit is not required in a sentry mode or a surround view mode. Therefore, a surround view serialization/deserialization chip and cable are not required, to simplify external cable connections, reduce occupation of data stream transfer resources, and further reduce power consumption of the vehicle.

In one embodiment, the sensor interface unit is connected to the intelligent driving domain control unit and the human-machine interaction domain control unit respectively through two groups of interfaces, where a signal transmitted by each group of interfaces includes: a synchronization signal, a control signal, and a video data stream signal.

The synchronization signal is used as a trigger signal of the sensor or a frame rate control signal of the sensor for video capture, and the control signal is used for configuration of the sensor or data reading.

In this way, two groups of signals are separately connected, so that the sensor data can be transmitted to two groups of interfaces in a manner of replication, and a synchronization signal and a control signal can be separately received, to configure and control the sensor. This connection mode is simplified. In some implementations, the sensor may be a camera.

In one embodiment, the sensor interface unit selects one of the intelligent driving domain control unit and the human-machine interaction domain control unit that are connected to the sensor interface unit to transmit the synchronization signal and/or the control signal.

According to the foregoing description, through the sensor interface unit, for example, a camera interface unit, one of two groups of signals, the synchronization signal and the control signal may be selected and sent to the sensor, for example, the camera, so that the sensor receives one of the synchronization signal or the control signal.

In one embodiment, the selection is performed based on at least one of the following factors: priorities and safety levels of the intelligent driving domain control unit and the human-machine interaction domain control unit, a running mode of the controller system, and a running status of the controller system.

According to the foregoing description, an example is that, because a function safety level required by the intelligent driving domain control unit for controlling the sensor is ASIL B (that is, a safety level is B), and a control requirement of the human-machine interaction domain control unit for the sensor is QM (QM represents a quality control level, and there is no requirement on a safety level), priorities may be set herein or selection may be performed based on safety levels thereof. By setting the foregoing priorities, after the foregoing two groups of signals, the synchronization signal and the control signal, are separately received, the controller can be taken over by the intelligent driving domain control unit with a high priority, to meet a safety requirement. The operating model and operating status can also be flexibly set based on various requirements.

In one embodiment, the synchronization signal transmitted between the camera interface unit and the intelligent driving domain control unit is time-synchronized with the synchronization signal transmitted between the camera interface unit and the human-machine interaction domain control unit.

In this way, time synchronization of the two groups of synchronization signals is set, so that when a control right of the sensor interface unit is switched over, smooth switching of a trigger time point and a frame rate of image capture exposure of the sensor can be implemented, to avoid jitter of a captured image.

In one embodiment, the controller system further includes at least one of the following:

a first display interface unit connected to the intelligent driving domain control unit, where the first display interface unit is connected to an instrument display unit; or a second display interface unit connected to the human-machine interaction domain control unit, where the second display interface unit is connected to a display screen.

In this way, the first display interface unit is used, so that the intelligent driving domain control unit may send, to an instrument for displaying, some vehicle information, such as driving information (a vehicle speed, a rotation speed, and a mileage) and vehicle status information (such as a water temperature, a fuel amount, an electricity amount, and a temperature), and other content that is required to be displayed by using the instrument. The second display interface unit is used, so that the human-machine interaction domain control unit may send, to a display screen for displaying, some content that includes, for example, an image outside the vehicle, a navigation image, and a human-machine interaction user interface and that is required to be displayed by using a display screen in the vehicle such as a central control display screen or a rear display screen.

In one embodiment, the controller system further includes: a network switching unit, connected to the intelligent driving domain control unit and the human-machine interaction domain control unit.

In this way, a gateway switching function is integrated in the controller system to implement internal data exchange, so that an external in-vehicle Ethernet gateway and connection cable are not required, external cable connections are simplified, and occupation of data stream transfer resources is reduced.

In one embodiment, the controller system further includes: a third domain control unit, connected to the network switching unit.

The third domain control unit is connected to one of the following: a chassis system control unit, a power system control unit, or a vehicle body system control unit.

In this way, the third domain control unit may implement control of a chassis domain, a power domain, and a vehicle body domain. Because a plurality of domains are combined, external cable connections are simplified, and occupation of data stream transfer resources is reduced.

In one embodiment, the network switching unit is further configured to connect to at least one of the following:

a laser radar sensor, a millimeter-wave radar sensor, an event data recorder, an internet of vehicles communication box, and an in-vehicle recorder.

In one embodiment, the intelligent driving domain control unit is configured to implement an assisted driving or autonomous driving function, some functions of vehicle control, or some functions of vehicle body control; the third domain control unit is configured to implement a chassis system control function, a power system control function, other functions of the vehicle control, or other functions of the vehicle body control; and the human-machine interaction domain control unit is configured to implement an entertainment domain application function or a human-machine user interface function.

In this way, some applications in vehicle control (VCU) and vehicle body control (BCM) function software may be flexibly deployed based on a computing power of the intelligent driving domain control unit and a computing power of the third domain control unit, to fully utilize a capability of a domain control unit with a higher computing power.

In one embodiment, the intelligent driving domain control unit is further configured to connect to at least one of the following:

a millimeter-wave radar, an ultrasonic radar, and an integrated positioning unit that includes, for example, a BeiDou satellite, GPS, GLONASS, and another positioning unit.

In one embodiment, the human-machine interaction domain control unit is further configured to connect to an audio device.

In one embodiment, the intelligent driving domain control unit or the human-machine interaction domain control unit includes:

an image processing module, a graphics rendering module, a network/video interface module, an artificial intelligence (AI) computing module, and a control module.

The control module is configured to perform scheduling on other modules and general calculation.

According to the foregoing structure, for the intelligent driving domain control unit, a function of directly outputting instrument display by the intelligent driving domain control unit is implemented, and an existing dedicated instrument SOC chip is replaced, to simplify an overall data path.

A second aspect of this application provides a vehicle control system, including the controller system in any one of the implementations.

Another aspect of this application provides a vehicle. The vehicle includes the controller system in any one of the implementations and at least one sensor connected to the vehicle controller system.

In one embodiment, the sensor includes one or more of the following sensors: a sensor for collecting image information, such as a camera, an infrared camera, or a tri-color depth (RGB-D) camera, a millimeter-wave radar for collecting a distance, a speed, and a direction of a target object, a laser radar for collecting point cloud information, a millimeter-wave radar, an ultrasonic radar, an integrated positioning unit, a steering wheel pressure sensor, an inertial sensor, and an acceleration sensor. In one embodiment, the integrated positioning unit includes one of the following: a BeiDou positioning unit, a GPS positioning unit, and a GLONASS positioning unit.

In one embodiment, the vehicle controller system may further be connected to at least one of the following devices: an event data recorder, an internet of vehicles communication box (TBOX), an in-vehicle recorder, a display screen, a power amplifier, a speaker, and the like. In one embodiment, the display screen may include a liquid crystal display screen and/or a virtual display screen. The virtual display screen includes a virtual head-up display.

In one embodiment, when at least one of the foregoing sensors or the foregoing devices is connected to the vehicle control system in this application, the sensors or the foregoing devices may be connected to a corresponding interface, for example, the foregoing sensor interface unit, such as a camera interface unit, a CAN interface unit, a network switching unit, or a display interface unit, to communicate with a corresponding domain control unit in this application. In one embodiment, when the domain control unit may support being directly connected, the domain control unit may alternatively be directly connected to the foregoing sensor or device.

A third aspect of this application provides a data processing method. The method includes:

receiving data of a sensor through a sensor interface unit; and transmitting the data of the sensor to an intelligent driving domain control unit and a human-machine interaction domain control unit.

In one embodiment of the third aspect, the method further includes:

selecting one of a connection between the sensor interface unit and the intelligent driving domain control unit and a connection between the sensor interface unit and the human-machine interaction domain control unit to transmit one or more of the following to the sensor: a synchronization signal and a control signal.

The synchronization signal is used as a trigger signal of the sensor or a frame rate control signal of the sensor for video capture, and the control signal is used for configuration of the sensor or data reading.

In one embodiment the selection is performed based on at least one of the following factors: priorities and safety levels of the intelligent driving domain control unit and the human-machine interaction domain control unit, a running mode of the controller system, and a running status of the controller system.

In one embodiment, the method further includes: enabling the synchronization signal transmitted by the intelligent driving domain control unit to be time-synchronized with the synchronization signal transmitted by the human-machine interaction domain control unit.

In one embodiment the method further includes:

generating, by using the intelligent driving domain control unit, content displayed by using an instrument display unit; and transmitting, by using a first display interface unit, the generated content displayed by using an instrument display unit to an instrument display unit for displaying.

In one embodiment, the method further includes:

generating, by using the human-machine interaction domain control unit, content displayed by using a display screen; and transmitting, by using a second display interface unit, the generated content displayed by using a display screen to a display screen for displaying.

A fourth aspect of this application provides a control method, applied to the controller system in any one of the implementations, where the method includes:

receiving data of a sensor through a sensor interface unit; and performing human proximity detection or intrusion detection based on the data of the sensor by using a human-machine interaction domain control unit; and when an exception is detected, sending the data of the sensor to an in-vehicle recorder by using a network switching unit.

Therefore, when the sentry mode is implemented, power consumption is very low because there are few data streams and few hardware resources are occupied.

In one embodiment, when the exception is detected, the method further includes:

generating alert data by using the human-machine interaction domain control unit; and sending the alert data to an audio device for playing, or sending, by using a second display interface unit, the alert data to a display screen for displaying.

A fifth aspect of this application provides a control method, applied to the controller system in any one of the implementations, where the method includes:

receiving data of a sensor through a sensor interface unit; and performing, by using a human-machine interaction domain control unit, image processing based on the data of the sensor, to generate surround view image data; and sending, by using a second display interface unit, the surround view image data to a display screen for displaying.

Therefore, when the surround view mode is implemented, power consumption is very low because there are few data streams and few hardware resources are occupied.

A sixth aspect of this application provides a system startup method, applied to the controller system in any one of the implementations. The method includes:

separately performing, by an intelligent driving domain control unit and a human-machine interaction domain control unit, initialization, where a speed at which the intelligent driving domain control unit performs initialization is lower than a speed at which the human-machine interaction domain control unit performs initialization;

after the initialization performed by the human-machine interaction domain control unit is completed, receiving a synchronization signal or a control signal of the human-machine interaction domain control unit through a sensor interface unit, and sending the synchronization signal or the control signal to a sensor, to enable a surround view mode; and after the initialization performed by the intelligent driving domain control unit is completed, receiving a synchronization signal or a control signal of the intelligent driving domain control unit through the sensor interface unit, and sending the synchronization signal or the control signal to the sensor, to take over control on the sensor interface unit or the sensor.

In this way, in powered-on startup of the vehicle, first, the surround view mode is quickly enabled, and then when the vehicle is normal after being powered on, the intelligent driving domain control unit with a high safety level takes over control of the sensor interface unit and the sensor. Switchover based on the foregoing priority control and takeover is implemented, to ensure high safety.

These and other aspects of the present application are clearer and easier to understand in descriptions of the following (a plurality of) embodiments.

BRIEF DESCRIPTION OF DRAWINGS

The following further describes features of the present application and relationships between the features with reference to the accompanying drawings. The accompanying drawings are all examples, and some features are not shown in actual proportions. In addition, in some accompanying drawings, common features, that are not mandatory for this application, in the field of this application may be omitted, or additional features that are not mandatory for this application are shown. A combination of the features shown in the accompanying drawings is not intended to limit this application. In addition, in this specification, content referred to by same reference signs is also the same. The specific accompanying drawings are described as follows:

FIG. 8 is a schematic flowchart of a control method according to an embodiment of this application;

FIG. 9 is a schematic flowchart of a control method according to another embodiment of this application;

FIG. 11 is a schematic diagram of a data processing method according to an embodiment of this application;

FIG. 12 is a schematic diagram of a data processing method according to another embodiment of this application;

DESCRIPTION OF EMBODIMENTS

Figure 1A:
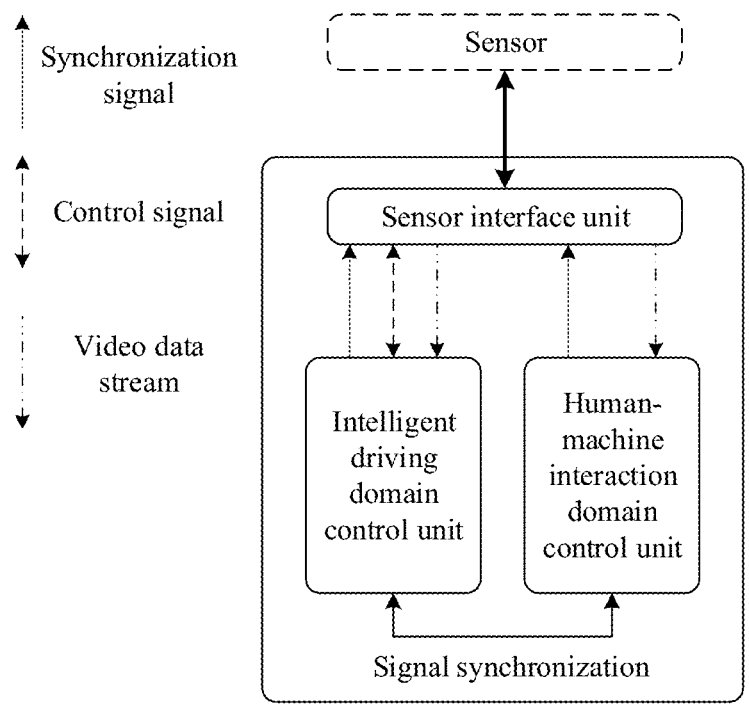
FIG. 1A is a schematic diagram of a controller system according to an embodiment of this application.

In this specification and claims, the terms "first, second, third, and the like" or similar terms such as a module A, a module B, and a module C are merely used to distinguish between similar objects, and do not represent a specific order of the objects. It may be understood that specific orders or sequences may be exchanged if permitted, so that embodiments of this application described herein can be implemented in an order other than an order illustrated or described herein.

In the following descriptions, involved reference numerals such as S110 and S120 that indicate operations do not necessarily indicate that the operations are to be performed based on the order, and consecutive operations may be transposed if allowed, or may be performed simultaneously.

The term "include" used in this specification and claims should not be construed as being limited to the content listed below, and does not exclude other elements or operations. It should be construed as specifying existence of a mentioned feature, whole, operation, or part, but does not preclude existence or addition of one or more other features, wholes, operations, or parts and their groups. Therefore, the expression "a device including an apparatus A and an apparatus B" should not be limited to a device including only the components A and B.

"One embodiment" or "an embodiment" mentioned in this specification means that a particular feature, structure, or characteristic described in combination with the embodiment is included in at least one embodiment of the present application. Therefore, the terms "in one embodiment" or "in an embodiment" that appear in this specification do not necessarily indicate a same embodiment, but may indicate a same embodiment. Further, in one or more embodiments, the particular features, structures, or properties can be combined in any proper manner, as will be clear from this disclosure to a person of ordinary skill in the art.

Unless otherwise defined, all technical and scientific terms used in this specification have same meanings as those usually understood by a person skilled in the art of this application. In case of any inconsistency, the meaning described in this specification or the meaning obtained according to the content recorded in this specification is used. In addition, the terms used in this specification are merely for the purpose of describing embodiments of this application, but are not intended to limit this application. To accurately describe the technical content in this application and accurately understand the present application, before the specific implementations are described, the following explanations, descriptions, or definitions are provided for terms used in this specification:

(1) Domain Control Unit, which is referred to as DCU (Domain Control Unit) or DCM (Domain Control Module) for short. The "domain" is to divide an automobile electronic system into several functional blocks based on functions. Each functional block may be referred to as a domain, for example, a vehicle domain, a vehicle body domain, an intelligent driving domain, and a human-machine interaction domain. The domain control unit can reduce a quantity of ECUs in a vehicle and reduce system complexity. Each domain has a domain controller, which may also be referred to as a domain control unit, and includes one or more processors, responsible for processing and forwarding functions in the domain. Components or modules in a domain are usually connected through low-speed communication, and domain control units are connected through high-speed communication. It should be noted herein that a domain division manner is not unique. For example, a vehicle domain is also divided into a power domain and a chassis domain by a manufacturer. For another example, the vehicle domain is divided into a vehicle control domain, an intelligent driving domain, an intelligent cockpit domain, and the like. Common settings of the domain control units are as follows:

An intelligent driving domain control unit may also be referred to as an advanced driver assistance system/autonomous driving (ADAS/AD) domain control unit, an ADAS/AD domain controller, or the like, and may be configured to converge data of various sensors to perform sensing and decision-making, to implement assisted driving or autonomous driving. For example, sensor data from a camera, an ultrasonic radar, a millimeter-wave radar, a laser radar, a GPS/inertial measurement unit (IMU), and a map is converged to implement assisted driving or autonomous driving through sensing and decision-making. The intelligent driving domain control unit has high requirements on computing and data processing capabilities, and needs to meet a high automotive safety integration level (ASIL), such as ASIL B, ASIL C, or ASIL D.

A human-machine interaction domain control unit may also be referred to as an in-vehicle infotainment/human-machine interaction (IVI/HMI) domain control unit, and is configured to provide functions such as in-vehicle information and in-vehicle entertainment, and may provide geographic information, multimedia entertainment, intelligent transportation services, and the like for a user, and may implement interaction, content display, sound playing, and the like related to entertainment information through human-machine interaction, including collecting user information by using sensors and displaying information to the user by using display or through sound, for example, collecting driver face information, fingerprint information, voice information, steering wheel pressure information, and pedal pressure information, and the like. The human-machine interaction domain control unit can also be referred to as a cockpit domain control unit, or a cockpit domain controller (CDC).

A vehicle domain control unit (VCU) is an assembly controller of a power system of electric vehicles (hybrid and pure electric vehicles). The vehicle domain control unit is used to control a vehicle chassis system, for example, control a brake system, a parking system, a vehicle body driving stability system, and a steering system, and control a vehicle power system, for example, control a power supply system, a charging system, a motor (for an electric vehicle), and an engine system (for a fuel vehicle). It can also be referred to as vehicle domain controller (VDC).

A vehicle body domain control unit (BCM) is used to control a vehicle body system, for example, control a door, a window, and a seat on a vehicle body.

It should be noted that the foregoing division and names of the domain control unit are merely examples, and are not limited thereto. With evolution and development of technologies, names of the domain control unit may also be different.

(2) Surround view display, which refers to that a plurality of vehicle cameras are used to capture images around a vehicle, and the images are spliced and displayed by using a vehicle display screen.

(3) Sentry mode, which is a surveillance mode of a vehicle used when the vehicle is parked. Cameras are used to monitor a vehicle environment. When a person outside the vehicle approaches or intrudes, video data is recorded and an alarm is generated.

(4) Serializer/deserializer (Ser/Des), is a high-speed communication interface circuit. The serializer is configured to convert low-speed parallel signals into high-speed serial signals for transmission, and the deserializer is configured to convert high-speed serial signals into low-speed parallel signals for transmission. The serializer and the deserializer may be disposed separately or may be set in an integrated manner. The serializer is set on a transmit side, and the deserializer is set on a receive side. The serializer/deserializer may implement high-speed transmission of multi-bit video data, and may be referred to as a display SERDES interface when being applied to video transmission with a display component, and may be referred to as a camera SERDES interface when being applied to data transmission with a camera sensor.

(5) Display serial interface (DSI) and camera serial interface (CMOS Serial Interface (CSI)), referred to as a display interface and a camera interface for short respectively, which are standard interfaces in the mobile industry processor interface (MIPI), and are respectively used to be connected to a display and a camera.

Figure 13A:
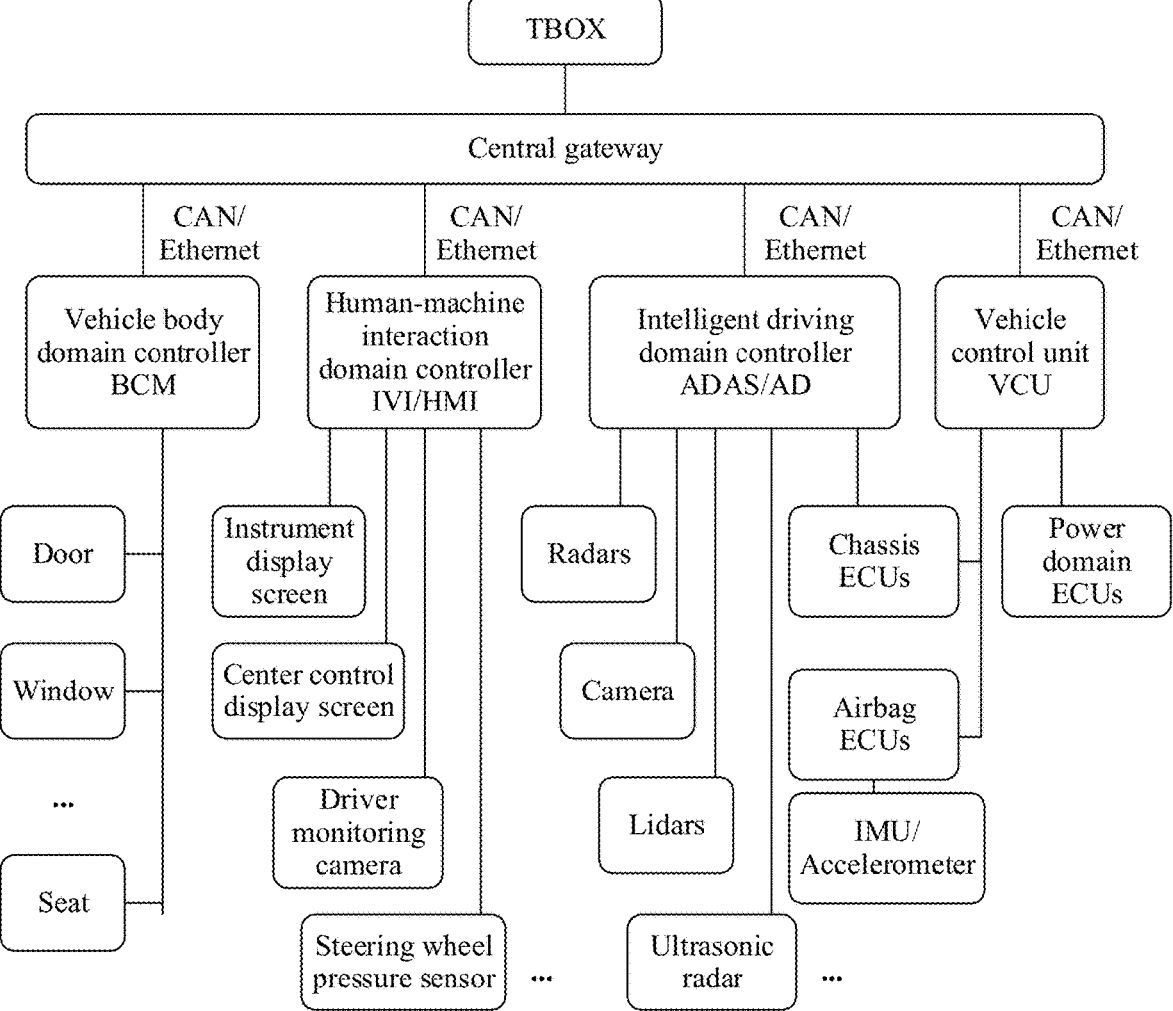
FIG. 13A is a schematic diagram of an architecture that includes independent domain controllers in the current technology.

Each component or function of a traditional vehicle requires one or more electronic control units (ECU) for control. A current main solution of an intelligent vehicle is an architecture that includes a plurality of independent domain controllers. For example, for an electronic and electrical architecture of a vehicle, refer to FIG. 13A. The electronic and electrical architecture is generally divided into a vehicle body control domain, a human-machine interaction domain, an intelligent driving domain, and a vehicle control domain. Each domain controller communicates with an internet of vehicles communication box (TBOX) through a controller area network (CAN) bus/an Ethernet cable via a central gateway. The following uses an example to describe a data stream forwarding process of the architecture.

Figure 13B:
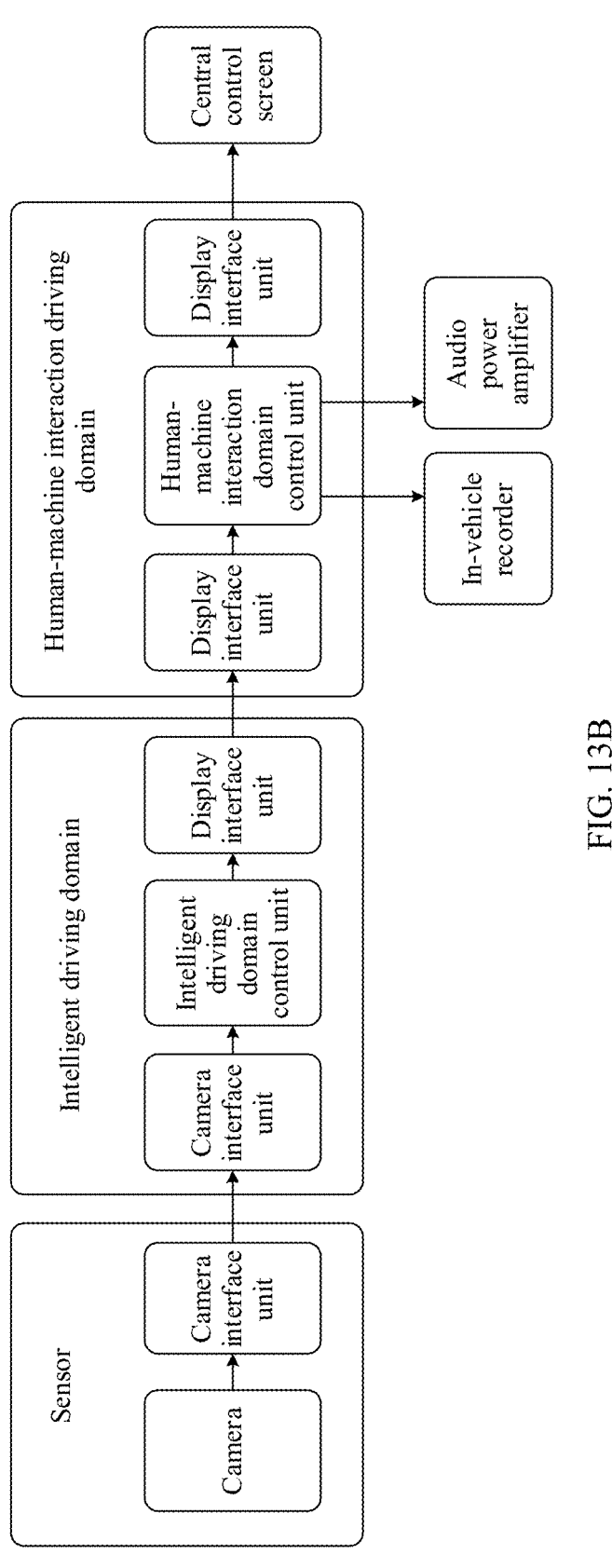
FIG. 13B is a schematic diagram of a data stream in a surround view/sentry mode in the current technology.

Example 1: As shown in FIG. 13B, a data stream in a surround view/sentry mode is as follows:

Surround view display: The camera first sends video data to the ADAS/AD domain controller, and an internal image signal processing (ISP) module of the ADAS/AD domain controller processes the original data into data of an RGB/YUV (RGB and YUV are two encoding manners of colors) data format and forwards the data to the human-machine interaction domain controller. The human-machine interaction domain controller forwards the video data to a central control screen for displaying.

Sentry mode: The camera first sends video data to the ADAS/AD domain controller, and the internal ISP of the ADAS/AD domain controller processes the original data into data of an RGB/YUV data format and forwards the data to the human-machine interaction domain controller. The human-machine interaction domain controller performs human proximity/intrusion detection. If an illegal intrusion is detected, the video data is forwarded to an in-vehicle digital video recorder (DVR) for storage and an alarm is generated through the central control screen or audio amplifier.

Figure 13C:
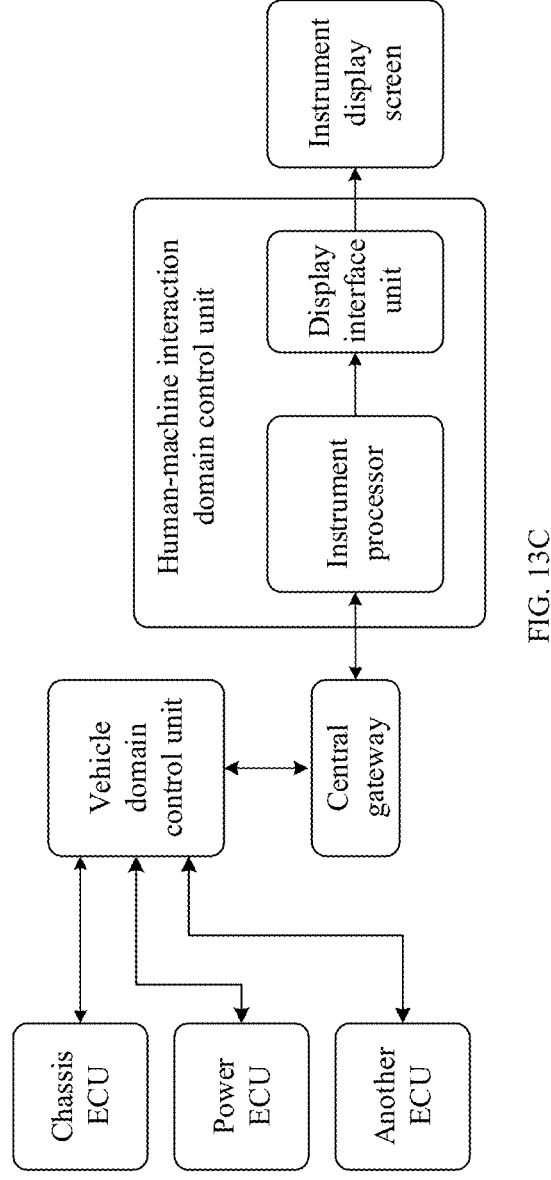
FIG. 13C is a schematic diagram of a data stream of data displayed by an instrument in the current technology.

Example 2: As shown in FIG. 13C, a data stream of instrument display data is as follows: The VCU collects information about chassis body control and the power ECU and transfers information required for displaying such as a vehicle speed to an instrument processor. The instrument processor performs image rendering by using an image processing module (GPU), and then sends an image to an instrument screen for displaying. In the foregoing architecture, the plurality of independent domain controllers are used. Therefore, installation of the vehicle occupies a large space, and additional video/Ethernet cables are required. In addition, in the foregoing example, the architecture causes transfer of a data stream for a number of times, which occupies a large quantity of hardware resources and causes high power consumption.

It may be understood that the foregoing architecture is merely an example solution, and a vehicle architecture is also in continuous development. In addition to several domain control units, the vehicle may further include some ECUs that are independent of the domain control units and that are used for specific components or functions. These in-vehicle devices have computing and processing capabilities, and may also be referred to as an in-vehicle computing device, a computing platform, or the like.

Moreover, an increasing quantity of and types of sensors disposed on vehicles pose challenges to connections between sensors and controllers or control units in vehicles and signal transmission.

This application provides another controller system and an application based on the controller system, to reduce occupation of data stream transfer resources, reduce vehicle power consumption in different in-vehicle application scenarios, improve a function startup speed of the vehicle, and improve user experience. First, an intelligent driving domain controller, a human-machine interaction domain controller, vehicle control, and vehicle body control can be deeply integrated, to simplify external cable connections. Second, a flexible connection manner between a sensor and an in-vehicle computing device may also be provided, to improve sharing of sensor data.

The controller system provided in this application may be applied to a vehicle such as an intelligent vehicle or a ship with an intelligent driving function, or may be applied to an application scenario such as a robot.

The following describes this application in detail with reference to the accompanying drawings.

An embodiment of this application provides a controller system. The controller system includes one or more in-vehicle control units and a sensor interface unit. The in-vehicle control unit may be a domain control unit or an ECU. These in-vehicle control units may be deployed on same hardware. For example, a plurality of systems on chip (SOC) are deployed on one hardware platform, and each SOC corresponds to one in-vehicle control unit. The in-vehicle control unit may be separately deployed on independent hardware. This is not limited in this embodiment of this application. For ease of description, an example in which the in-vehicle control unit is an intelligent driving domain control unit and an example in which the in-vehicle control unit is a human-machine interaction domain control unit are used below for description. It may be understood that embodiments of this application are not limited thereto. In actual application, the in-vehicle control unit may be another domain control unit or an electronic control unit. As shown in FIG. 1A, an intelligent driving domain control unit, a human-machine interaction domain control unit, and a sensor interface unit are included. The sensor interface unit is connected to the intelligent driving domain control unit and the human-machine interaction domain control unit. The sensor interface unit further has an external interface to connect to an external sensor. The sensor interface unit may be configured to transmit data of the sensor to the intelligent driving domain control unit and the human-machine interaction domain control unit. It should be noted that the name of the domain control unit in this application is merely an example. An intelligent driving domain control unit, a human-machine interaction domain control unit, or the like is used as an example for description, and is not limited thereto. It may be understood that, with evolution and development of technologies, units or modules configured to implement corresponding functions may also be named with other names.

Figure 6A:
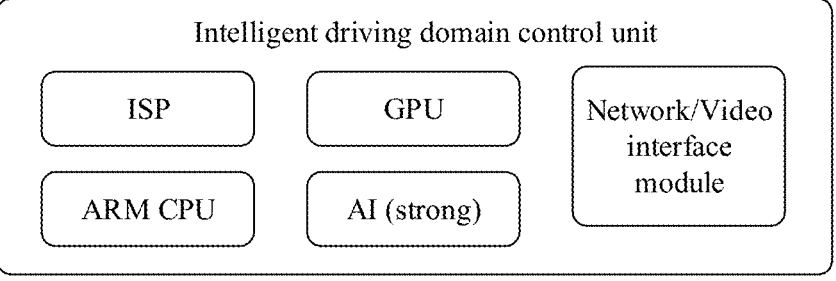
FIG. 6A is a schematic diagram of the inside of an intelligent driving domain control unit according to an embodiment of this application.

The intelligent driving domain control unit may perform sensing and decision-making by using received data of one or more sensors, to implement assisted driving or autonomous driving. As a first domain control unit in this application, the intelligent driving domain control unit may include an electronic control unit (ECU), a micro control unit (MCU), a central processing unit (CPU), a graphics processing unit (GPU), or another control unit, and may be implemented by a single control unit or a plurality of control units. FIG. 6A shows an embodiment of one of the implementations, which is described below.

Figure 1B:
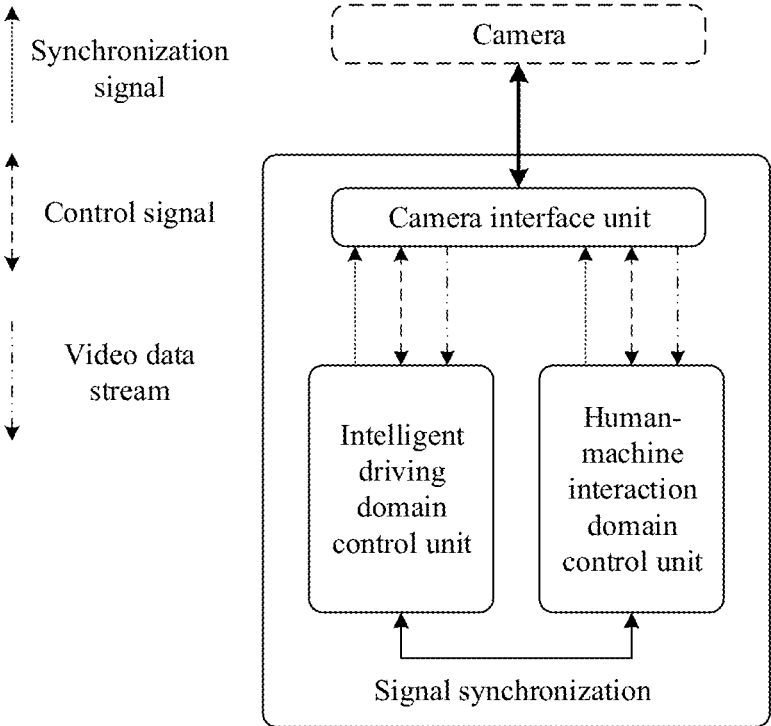
FIG. 1B is a schematic diagram of a controller system according to another embodiment of this application.

The one or more sensors are configured to collect vehicle external information, and may include one or more of the following sensors: a sensor for collecting image information, such as a camera, an infrared camera, or a tri-color depth (RGB-Depth, RGB-D) camera, a millimeter-wave radar for collecting a distance, a speed, and a direction of a target object, a laser radar for collecting point cloud information, or a sensor for collecting other data. In this embodiment, an example in which a camera shown in FIG. 1B is used as the sensor is used for description below. A corresponding sensor interface unit is a camera sensing unit. Collected data may be image data outside a vehicle, for example, image data in front of a vehicle obtained in a driving process. The image data is used to sense a vehicle, a pedestrian, or the like in an image. A sensing result is used for decision-making during the assisted driving and the autonomous driving.

Figure 6B:
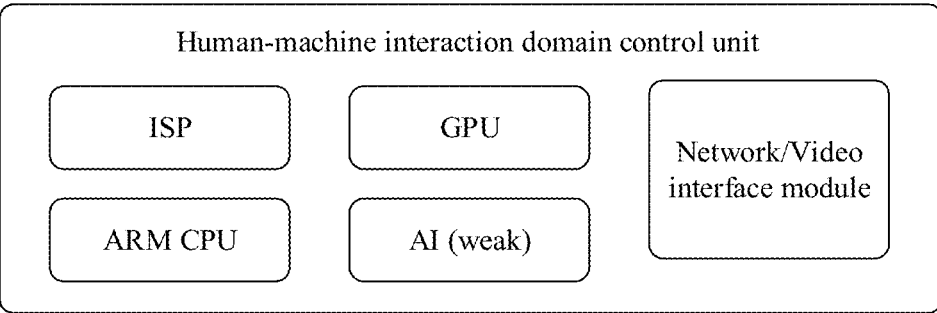
FIG. 6B is a schematic diagram of the inside of a human-machine interaction domain control unit according to an embodiment of this application.

The foregoing human-machine interaction domain control unit may perform facial recognition, action recognition, and the like by using received data of an external sensor, for example, a camera, and provide a function of an entertainment service. As a second domain control unit in this application, the human-machine interaction domain control unit may include an ECU, an MCU, a CPU, a GPU, or another control unit, and may be implemented by a single control unit or a plurality of control units, for example, may include a control unit of an in-vehicle infotainment system and a control unit of a human-machine user interface. FIG. 6B shows an embodiment of one of the implementations, which is described below.

When the human-machine interaction domain control unit is applied to the sentry mode, data of an external sensor, for example, data of a camera, may be a static face image outside a vehicle or a close-distance human body image. When the vehicle is in a static state, an image data obtained by the sensor is transmitted to the human-machine interaction domain control unit, to perform face detection, or perform intrusion detection based on action recognition, and the human-machine interaction domain control unit may further control forwarding data of a related camera to an in-vehicle recorder for recording.

In some embodiments, when the sensor interface unit is a camera interface unit, the sensor interface unit may be specifically a camera serialization/deserialization interface, to implement high-speed serial communication with an external camera.

In some embodiments, a manner in which the sensor interface unit is connected to the intelligent driving domain control unit and the human-machine interaction domain control unit includes: The sensor interface unit is connected to the intelligent driving domain control unit and the human-machine interaction domain control unit respectively through two groups of interfaces; and a signal transmitted between the sensor interface unit and the two domain control units may include a synchronization signal, a control signal, and a video data stream signal. For ease of description, the interface may be referred to as a synchronization signal interface, a control signal interface, and a video data stream signal interface based on a type of the transmitted signal. It may be understood that two or more of these interfaces may be integrated, and two or more of a synchronization signal, a control signal, and a video data stream signal may be combined for transmission. For example, the synchronization signal and the control signal are transmitted on one connection, and the video data stream signal is transmitted on one connection. For another example, the synchronization signal, the control signal, and the video data stream signal are transmitted on one connection. The interface can also be used as an independent interface to transmit the synchronization signal, the control signal, and the video data stream signal on three connections.

In some embodiments, the control signal may be transmitted by using an I2C signal, and the video data stream signal may be transmitted by using a CSI-2 signal.

In some embodiments, the video data stream signal may also be transmitted between the sensor interface unit and the two control units by using low voltage differential signaling (LVDS).

In some embodiments, corresponding to the two groups of interfaces, the sensor interface unit is specifically configured to:

receive a synchronization signal of the intelligent driving domain control unit or the human-machine interaction domain control unit by using two groups of synchronization signal interfaces, and send the synchronization signal to the sensor, where the synchronization signal is used as an exposure trigger signal or a frame rate control signal of an image captured by the sensor;

receive a control signal of the intelligent driving domain control unit or the human-machine interaction domain control unit by using two groups of control signal interfaces (for example, I2C signal interfaces), and send the control signal to the sensor, where the control signal is used for configuration of the sensor, for example, the camera, or read data, for example, performing high-dynamic-range rendering (HDR) mode configuration or exposure parameter configuration; and receive the sensor data, where the sensor interface unit replicates the data, and then transmits the data to the intelligent driving domain control unit and the human-machine interaction domain control unit respectively by using two groups of video data stream signal interfaces (such as a CSI-2 signal interface and an LVDS signal interface).

Each group of interfaces may include one or more physical transmission channels. The physical transmission channel herein may be one or more signal lines or cables. For example, when a CSI-2 signal is transmitted, each physical transmission channel may include a plurality of signal lines, for example, may be configured to transmit one pair of clock synchronization signals, one pair of data signals, two pairs of data signals, or four pairs of data signals. For another example, when an LVDS signal is transmitted, each physical transmission channel may include one pair of cables used to provide the LVDS signal. When each group of interfaces includes a plurality of physical transmission channels, video data may be separately received and sent by using different transmission channels, to improve data transmission efficiency or provide differentiated data transmission. For example, video data may be distributed to corresponding transmission channels for transmission based on load of different transmission channels. For another example, video data may be distributed to corresponding transmission channels for transmission based on different priorities, delay requirements, or the like.

In one embodiment, the sensor interface unit may separately send the video data stream signal to the intelligent driving domain control unit and the human-machine interaction domain control unit, but transmit the synchronization signal or the control signal, or the synchronization signal and the control signal to only one of the domain control units. In this manner, selection between the two control units is not required.

In some embodiments, the sensor interface unit selects one of the intelligent driving domain control unit and the human-machine interaction domain control unit that are connected to the sensor interface unit to transmit the synchronization signal or the control signal for configuration.

When the sensor interface unit is connected to a plurality of domain control units, a specific domain control unit for transmission of the synchronization signal or the control signal may be selected based on one or more factors such as priorities, safety levels, system running modes, and running statuses of the domain controller units. In one embodiment, a domain controller unit with a high priority may be selected to transmit the synchronization signal and the control signal. For example, in this embodiment, the sensor interface unit is connected to the intelligent driving domain control unit and the human-machine interaction domain control unit, and a priority of the intelligent driving domain control unit is higher than a priority of the human-machine interaction domain control unit. In one embodiment, a manner of selecting one of the domain control units for transmission includes: After receiving a synchronization signal or a control signal of the intelligent driving domain control unit, the sensor interface unit selects to transmit the synchronization signal or the control signal of the intelligent driving domain control unit.

In still another embodiment, a domain control unit with a high safety level may be selected to receive or send the synchronization signal and the control signal. This embodiment is still used as an example. Because a function safety level required by the intelligent driving domain control unit for controlling the sensor is ASIL B (that is, a safety level is B), and a control requirement of the human-machine interaction domain control unit for the sensor is QM (QM represents a quality control level, and there is no requirement on a safety level), a safety level requirement of the intelligent driving domain control unit is higher than a safety level requirement of the human-machine interaction domain control unit. The synchronization signal and the control signal of the intelligent driving domain control unit are transmitted to an external sensor connected to the sensor interface unit, in other words, the sensor is taken over by the intelligent driving domain control unit with a high priority.

In still another embodiment, based on a running status of the domain control unit, for example, starting and initializing of the human-machine interaction domain control unit are faster than starting and initializing of the intelligent driving domain control unit, and after the human-machine interaction domain control unit is started, the intelligent driving domain control unit is not yet running normally. In this case, after the initialization performed by the human-machine interaction domain control unit is completed, the synchronization signal and the control signal of the human-machine interaction domain control unit may be transmitted to the sensor. After the initialization of the intelligent driving domain control unit is completed, it may also be determined, based on the priorities, the safety levels, and other factors, whether the intelligent driving domain control unit is to take over control of the sensor and the synchronization signal and the control signal of the intelligent driving domain control unit are to be transmitted to the sensor.

In still another embodiment, the system is in a sentry mode. In this mode, the human-machine interaction domain control unit is powered on, but the intelligent driving domain control unit is not powered on. Therefore, the sensor interface unit receives only the synchronization signal and the control signal of the human-machine interaction domain control unit, and transmits the synchronization signal and the control signal to the external sensor.

In still another embodiment, the system is in a surround view mode, and in this mode, both the human-machine interaction domain control unit and the intelligent driving domain control unit are in a power-on state. Therefore, based on the foregoing priorities or safety levels, the sensor interface unit selects to transmit the synchronization signal and the control signal of the intelligent driving domain control unit to an external sensor.

In some embodiments, the synchronization signal transmitted between the sensor interface unit and the intelligent driving domain control unit is time-synchronized with the synchronization signal transmitted between the sensor interface unit and the human-machine interaction domain control unit.

In this way, time synchronization of the two groups of synchronization signals is set, so that when a control right of the sensor interface unit is switched over, smooth switching of a trigger time point and a frame rate of image capture exposure of the sensor can be implemented. The intelligent driving domain control unit and the human-machine interaction domain control unit may implement precise time synchronization based on time-sensitive networking (Time-Sensitive Networking, TNS), so that the synchronization signals that are sent are synchronized with time alignment respectively.

Figure 2:
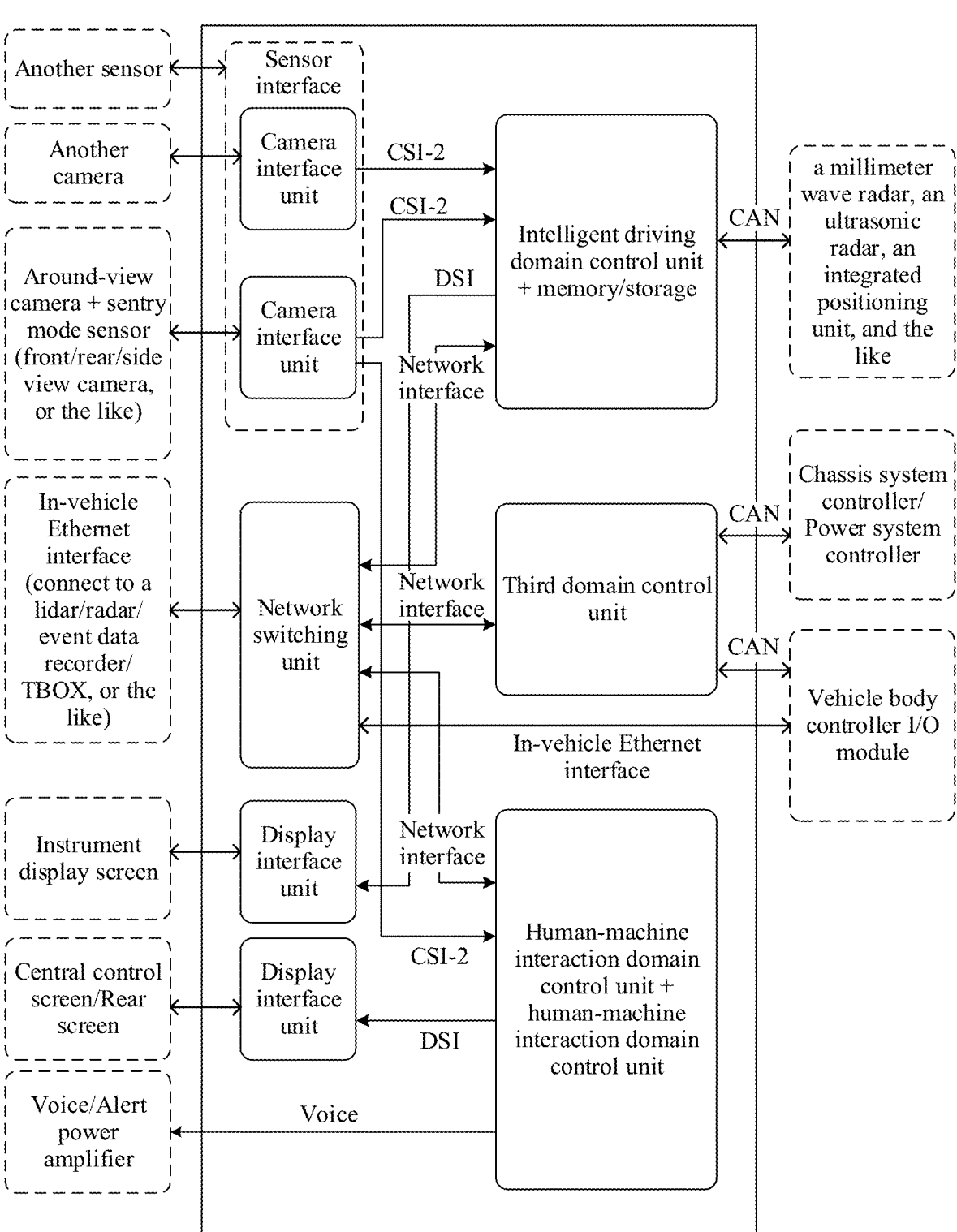
FIG. 2 is a schematic diagram of a controller system according to a specific implementation of this application.

In some embodiments, as shown in FIG. 2, the controller system further includes: a first display interface unit connected to the intelligent driving domain control unit, where the first display interface unit is connected to an instrument display unit; or a second display interface unit connected to the human-machine interaction domain control unit, where the second display interface unit is connected to a display screen. In addition, it should be noted that, in the example shown in FIG. 2, a camera interface unit is used as an example of a sensor interface unit. Correspondingly, an example in which a camera is used as a sensor is used for description. In addition, FIG. 2 further shows a sensor such as a millimeter-wave radar or an ultrasonic radar, and the sensor may be connected to the intelligent driving domain control unit through a CAN interface (for simplicity, the CAN interface unit that is included as a sensor interface is not drawn). In the example shown in FIG. 2, a video signal of the camera interface unit may be a CSI-2 signal provided by one or more physical transmission channels, or may be an LVDS signal provided by one or more physical transmission channels.

In this way, the first display interface unit is used, so that the intelligent driving domain control unit may send, to the instrument display screen for displaying, some vehicle information, such as driving information (a vehicle speed, a rotation speed, and a mileage) and vehicle status information (such as a water temperature, a fuel amount, an electricity amount, and a temperature), and other content that is required to be displayed by using the instrument display screen.

The second display interface unit is used, so that the human-machine interaction domain control unit may send, to a display screen for displaying, some content that includes, for example, an image outside the vehicle, a navigation image, and a human-machine interaction user interface and that is required to be displayed by using a display screen in the vehicle such as a central control display screen or a rear display screen.

In some embodiments, the display screen may be a liquid crystal display screen, or may be a virtual display screen, for example, a virtual head-up display (AR-HUD).

Figure 3:
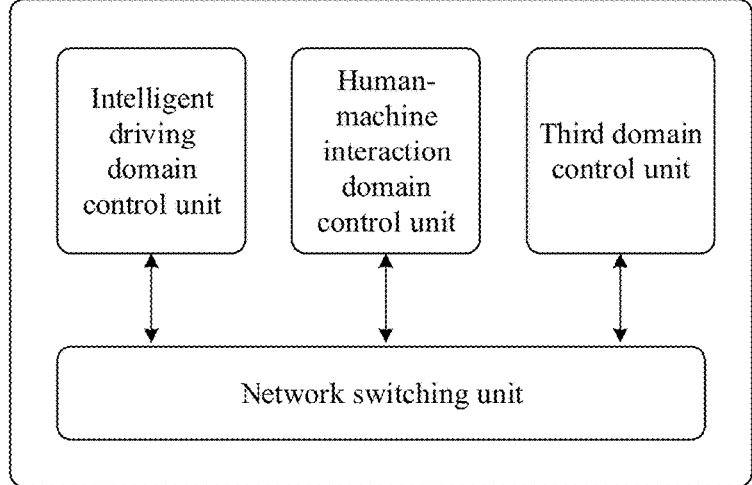
FIG. 3 is a schematic diagram of a controller system that includes a network switching unit according to an embodiment of this application.

In some embodiments, as shown in FIG. 2 or FIG. 3, the controller system further includes a network switching unit, connected to the intelligent driving domain control unit and the human-machine interaction domain control unit.

In this way, a gateway switching function is integrated in the controller system to implement internal data exchange, so that an external in-vehicle Ethernet gateway and connection cable are not required. The network interface implementation includes but is not limited to internal network interfaces such as a reduced gigabit media independent interface (RGMII), a reduced media independent interface (RMII), a serial gigabit media independent interface (SG-MII), a 10 G media independent interface (10 Gigabit Media Independent Interface, XGMII), and a 10 G basic transmission protocol (10G_base_R).

In some embodiments, as shown in FIG. 2 or FIG. 3, the controller system further includes: a third domain control unit, connected to the network switching unit, where the third domain control unit is connected to one of the following: a chassis system control unit, a power system control unit, or a vehicle body system control unit.

Figure 4:
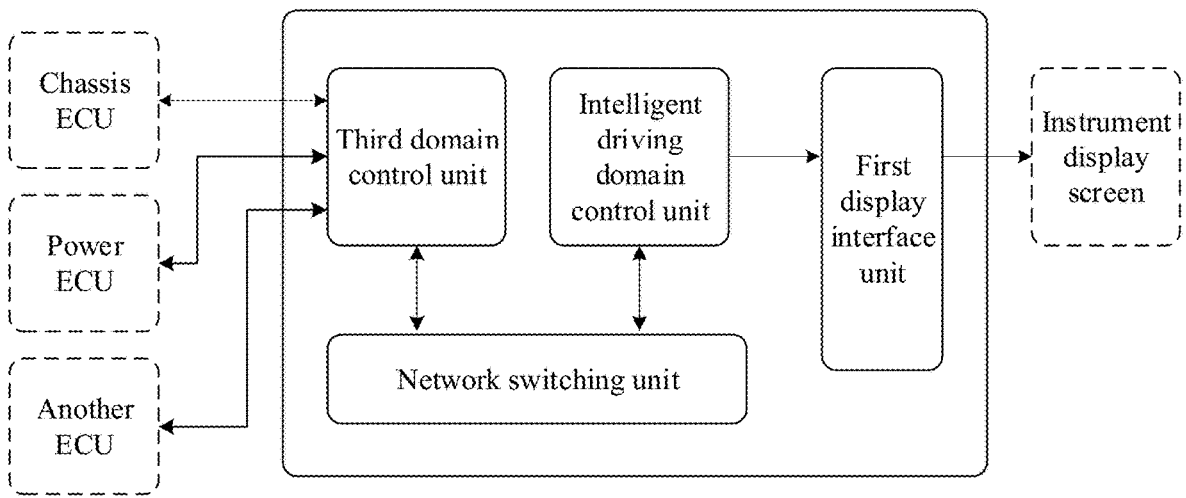
FIG. 4 is a schematic diagram of a data stream of data displayed by an instrument according to an embodiment of this application.

In some embodiments, the third domain control unit may be implemented by an MCU. As shown in FIG. 2 or FIG. 4, the third domain control unit may collect information of the chassis system control unit, the power system control unit, the vehicle body system control unit, or the like, or control these units. The collected information may be transferred to the intelligent driving domain control unit through the network switching unit. After performing internal processing (such as image processing and image rendering), the intelligent driving domain control unit sends, through the first display interface unit, the information to the instrument display unit for displaying.

The chassis system control unit manages an electric power steering system (EPS), a vehicle body stability system (ESP), an electronic park system (EPB), an intelligent brake system (IBS), an electronic stability control system (ESC), and the like. The power system control unit manages an electric motor system (for an electric vehicle), a battery management system (for an electric vehicle), a power supply transformation system (DC-DC, that is, direct current-to-direct current transformation) (for an electric vehicle), an on-board charging system (OBC) (for an electric vehicle), an engine system (for a fuel vehicle), and the like. The vehicle body system control unit manages a door, a window, a seat, and the like of the vehicle, and may further include other control units, such as an airbag system and a heat management system.

In some embodiments, as shown in FIG. 2, the network switching unit is further configured to connect to at least one of the following: a laser radar sensor, a millimeter-wave radar sensor, an event data recorder, an internet of vehicles communication box (TBOX), and an in-vehicle recorder.

The foregoing device may be connected through an Ethernet interface, to implement the foregoing collected data being transferred to the controller system, and provided for a corresponding domain control unit, or for communication with the domain control unit.

In some embodiments, as shown in FIG. 2, the intelligent driving domain control unit is further configured to connect to at least one of the following: a millimeter-wave radar, an ultrasonic radar, and an integrated positioning unit (including, for example, BeiDou, GPS, GLONASS, and the like).

The foregoing device may be connected through a CAN interface, so that the intelligent driving domain control unit obtains the sensor information.

Figure 5:
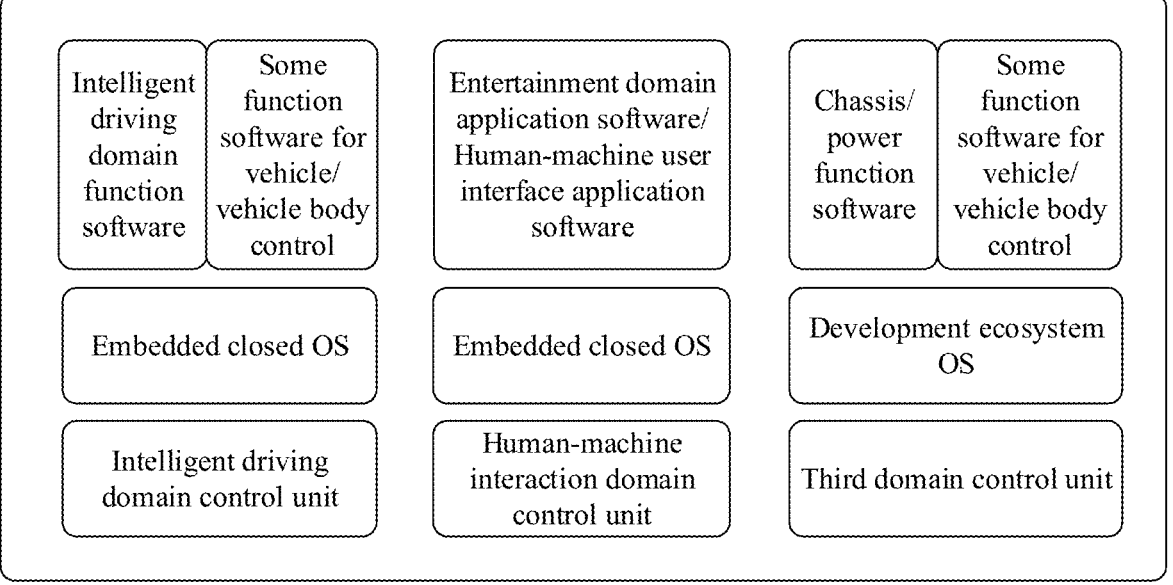
FIG. 5 is a schematic diagram of functional software in domain controllers according to an embodiment of this application.

Because the intelligent driving domain control unit, the human-machine interaction domain control unit, and the third domain control unit are connected to different devices, corresponding required function software may be flexibly deployed in the three domain control units. As shown in FIG. 5, one deployment manner may be as follows:

In addition to intelligent driving domain function software, some function software for vehicle control or some function software for vehicle body control are deployed in an integrated manner in the intelligent driving domain control unit. An underlying OS of the intelligent driving domain control unit may be closed to ensure safety.

In addition to chassis/power function software, some function software for the vehicle control or some function software for the vehicle body control are deployed in an integrated manner in the third domain control unit. An underlying OS of the third domain control unit may be closed to ensure safety.

Entertainment domain application software and human-machine user interface application software are deployed in the human-machine interaction domain control unit. An underlying OS of the human-machine interaction domain control unit may be open, to facilitate usage of various entertainment application software.

Some function software of the vehicle control or some applications of the vehicle body control may be deployed based on computing power of the intelligent driving domain control unit and the third domain control unit. For example, when the computing power of the third domain control unit is lower than the computing power of the intelligent driving domain control unit, some functions of the vehicle control may be deployed on the intelligent driving domain control unit. When these functions need to be used, the third domain control unit exchanges related data through the network switching unit, and running of the functions is implemented by the intelligent driving domain control unit, but direct information exchange (for example, a control signal or a collected sensor signal) with the chassis ECU and the power ECU related to the vehicle control is performed by the third domain control unit.

In some embodiments, as shown in FIG. 2, the human-machine interaction domain control unit is further configured to connect to an audio device.

The audio device includes a power amplifier, a loudspeaker, and the like, and may be configured to play alert information, human-machine interaction audio, and the like.

In some embodiments, the intelligent driving domain control unit or the human-machine interaction domain control unit includes an image processing module, a graphics rendering module, a network/video interface module, an AI computing module, and a control module, and the control module is configured to perform scheduling on other modules and general computing. The following provides detailed descriptions.

As shown in FIG. 6A, at least the following modules are integrated in the intelligent driving domain control unit, to achieve an overall function safety level not lower than ASIL B: an ISP module, mainly responsible for image processing; a GPU module, responsible for graphic rendering, where the graphic rendering is used for instrument displaying; a network/video interface module, configured to connect to an external interface device; an ARM CPU module, configured to perform overall scheduling and general-purpose computing; and an AI module, configured to accelerate computing in intelligent driving sensing computing, with a strong computing capability.

A GPU function is integrated in the intelligent driving domain control unit, so that a function of directly outputting instrument display by the intelligent driving domain control unit is implemented, and an existing dedicated instrument system on chip (SOC) is replaced, to simplify an overall data path.

As shown in FIG. 6B, at least the following modules are integrated in the human-machine interaction domain control unit, to achieve an overall function safety level not lower than ASIL B: an ISP module, mainly responsible for image processing; a GPU module, responsible for graphics rendering, where the graphics rendering is used for displaying of human-machine interaction and an entertainment service (IVI); a network/video interface module, configured to connect to an external interface device; an ARM CPU module, responsible for overall scheduling and general-purpose computing; and an artificial intelligence (Artificial Intelligence, AI) module, configured to perform AI computing related to human-machine interaction, and AI computing in the sentry mode, with a weak computing capability.

Figures 7A, 7B:
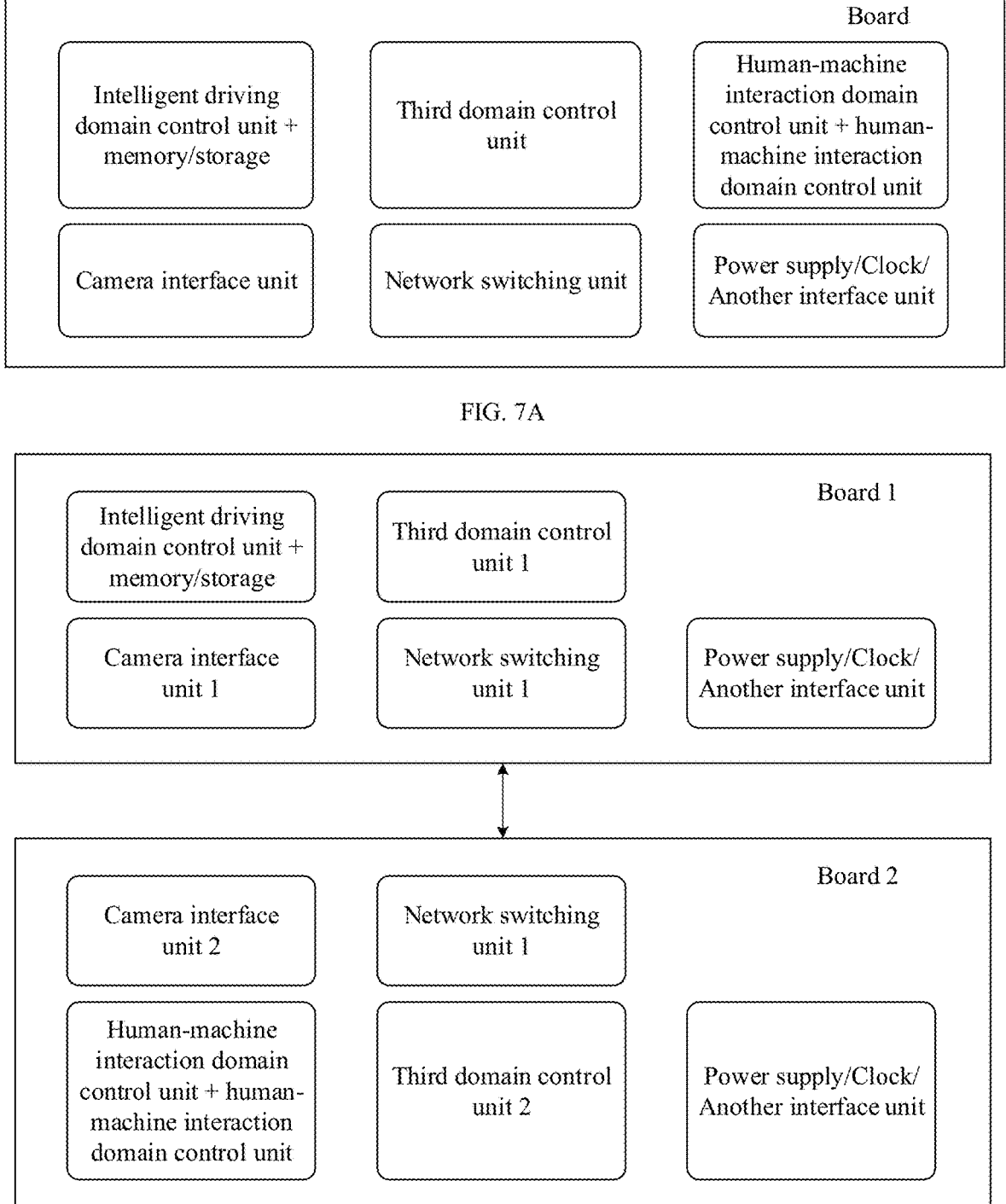
FIG. 7A is a schematic diagram of a first hardware form of a controller system according to an embodiment of this application.
FIG. 7B is a schematic diagram of a second hardware form of a controller system according to an embodiment of this application.

It should be noted herein that a hardware form of the controller system in this application, as shown in FIG. 7A, may be a circuit board, and may be implemented by stacking a plurality of boards as shown in FIG. 7B. For example, an I/O interface of the MCU includes but is not limited to being carried on one board, or being split to be carried on a plurality of boards. The plurality of boards may be connected to each other by using a daughter board connector, a flexible cable, and the like, to transmit a power signal, a low-speed data signal, a video signal (such as the foregoing CSI-2), an image control signal (such as the foregoing DSI), and a network signal (such as XGMII and SGMII).

The controller system in this application may further include a plurality of independent hardware devices and sensor interface units. One or more control units are deployed in each hardware device, and the hardware devices are connected to each other by using a cable.

The sensor interface unit is configured to obtain a sensor signal from a connected sensor and transmit the sensor signal to one or more control units in the controller system, and is further configured to obtain, from one or more control units in the controller system, a synchronization signal or a control signal for configuration of the connected sensor. For example, the connected sensor is a camera that captures image information, and correspondingly, the sensor signal includes a video signal.

The sensor interface unit may include one or more serialization/deserialization interfaces, and may further include an LVDS signal interface.

The serialization/deserialization interface is configured to transmit a video signal, for example, between a camera and a control unit, or between a control unit and a control unit.

In one embodiment, a serialization/deserialization interface is separately configured for each control unit that needs to transmit a video signal. If a video signal is transmitted between two control units, the two control units are deployed on different hardware devices, and the hardware devices are connected by using a coaxial cable, a first LVDS interface and a second LVDS interface need to be configured for the two control units respectively, so that the video signal is transmitted in a form of an LVDS signal between the control units deployed on different hardware devices. Configuring a serialization/deserialization interface may be deploying a serializer/deserializer that implements a serializer/deserializer interface function and a corresponding control unit on same hardware. The first LVDS interface includes one or more pairs of cables, and the second LVDS interface includes one or more pairs of cables. The video signal may be transmitted separately on one or more physical transmission channels on the two interfaces.

An example in which the controller system includes a first control unit, a second control unit, and a sensor interface unit is used for description. The sensor interface unit includes a first serialization/deserialization interface and a second serialization/deserialization interface. The first control unit includes an SOC 1 configured to process a sensor signal, and the second control unit includes an SOC 2 configured to process a sensor signal. The first control unit obtains a video signal through the first serialization/deserialization interface, and the second control unit obtains the video signal through the second serialization/deserialization interface.

In one embodiment, the video signal is replicated in the sensor interface unit, and two groups of signals are respectively transmitted to the first control unit and the second control unit through the first serialization/deserialization interface.

In still another embodiment, the video signal may be transmitted to the first control unit through the first serialization/deserialization interface, then the first serialization/deserialization interface transmits the video signal to the second LVDS interface in a form of an LVDS signal through the first LVDS interface, and the second LVDS interface transmits the video signal to the second serialization/deserialization interface. After converting the data into serial data, the second serialization/deserialization interface transmits the serial data to the second control unit. It should be noted that, the video signal may alternatively be transmitted to the second control unit through the second serialization/deserialization interface, then the second serialization/deserialization interface transmits the video signal to the first LVDS interface in a form of an LVDS signal through the second LVDS interface, and the first LVDS interface transmits the video signal to the first serialization/deserialization interface.

In the controller system provided in the foregoing embodiment, a sensor can be shared among a plurality of control units, to reduce costs and space for deployment.

Further, if the first control unit is started faster than the second control unit, configuration of the sensor may be performed after the first control unit is started, so that the sensor can be started in a timely manner to obtain information around the vehicle, to improve user experience.

Further, if a processing capability of the second control unit is stronger than a processing capability of the first control unit, for example, an image processing module is deployed in the second control unit, a video signal processed by the second control unit may be further transmitted to the first control unit by using the sensor interface unit, so that the first control unit obtains the processed video signal.

The first control unit may be a human-machine interaction domain control unit or another ECU, and the second control unit may be an intelligent driving domain control unit or another ECU.

Another embodiment of this application provides a vehicle control system. The vehicle control system includes the controller system in any one of the implementations. Another embodiment of this application further provides a vehicle. The vehicle includes the controller system in any one of the implementations, and the vehicle further includes at least one of the following sensors or at least one of the following devices:

Sensors: The sensor includes one or more of the following sensors: a sensor for collecting image information, such as a camera, an infrared camera, a tri-color depth (RGB-Depth, RGB-D) camera, a millimeter-wave radar for collecting a distance, a speed, and a direction of a target object, a laser radar for collecting point cloud information, a millimeter-wave radar, an ultrasonic radar, an integrated positioning unit (including a positioning unit such as BeiDou, GPS, or GLONASS), a steering wheel pressure sensor, an inertial sensor, and an acceleration sensor.

Devices: an event data recorder, an internet of vehicles communication box (TBOX), an in-vehicle recorder, a display screen, a power amplifier, and a speaker. The display screen may be a liquid crystal display screen, or may be a virtual display screen, for example, a virtual head-up display.

Refer to FIG. 2. When at least one of the foregoing sensors or devices is connected to the vehicle control system in this application, the sensor or device may be connected to a corresponding interface, for example, the foregoing sensor interface unit (such as the camera interface unit and the CAN interface unit), or the network switching unit, or the display interface unit, to communicate with the corresponding domain control unit in this application.

Another embodiment of this application provides a control method and the method is applied to the foregoing controller system. Herein, a sentry mode applied to a vehicle is used as an example for description. As shown in FIG. 8, the method includes the following operations.

S110: After powered-on initialization in the sentry mode is implemented, receive data of a camera through a camera interface unit.

Only a camera, a camera interface unit, a human-machine interaction domain control unit, and a related display module related to the sentry mode are powered on, and other irrelevant modules may not be powered on, to implement low power consumption in the mode. In addition, in this mode, the camera and the camera interface unit receive a synchronization signal and a control signal of the human-machine interaction domain control unit, that is, the human-machine interaction domain control unit takes over the camera and the camera interface unit.

S120: Perform human proximity detection or intrusion detection based on the data of the camera by using the human-machine interaction domain control unit. For example, after performing image processing by using an internal ISP module of the human-machine interaction domain control unit, the human-machine interaction domain control unit performs the human proximity detection or the intrusion detection by using an internal AI module.

S130: When an exception is detected, send, by using a network switching unit, the data of the camera obtained by the human-machine interaction domain control unit to an in-vehicle recorder.

In some embodiments, when the exception is detected, the method further includes: generating alert data by using the human-machine interaction domain control unit; and sending the alert data to an audio device for playing, or sending, by using a second display interface unit, the alert data to a display screen for displaying.

Another embodiment of this application provides a control method and the method is applied to the controller system. Herein, an example in which a surround view mode is applied in a vehicle is used for description. As shown in FIG. 9, the method includes the following operations.

S210: Receive data of a camera through a camera interface unit.

S220: Perform image processing on the data of the camera by using a human-machine interaction domain control unit to generate surround view image data. For example, the human-machine interaction domain control unit performs image processing by using an internal ISP module of the human-machine interaction domain control unit, including converting an image format from a RAW format to an RGB format, performing image rendering by using an internal GPU module, and performing processing such as 3D surround view splicing based on image data of a plurality of cameras and overlaying an image on a vehicle model image, to generate the surround view image data.

S230: Send, by using a second display interface unit, the surround view image data to a display screen for displaying.

Figure 10A:
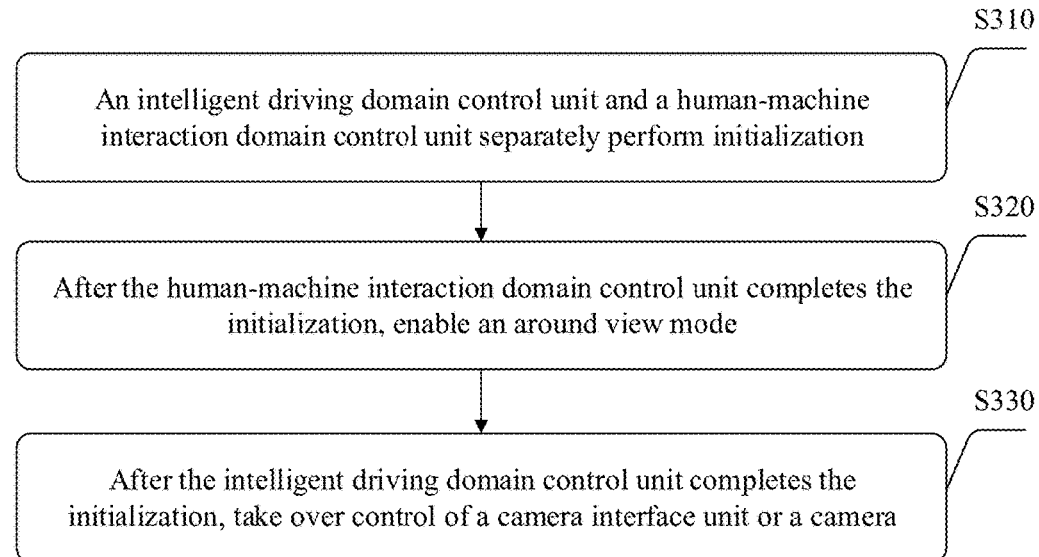
FIG. 10A is a schematic flowchart of a system startup method according to an embodiment of this application.
Figure 10B:
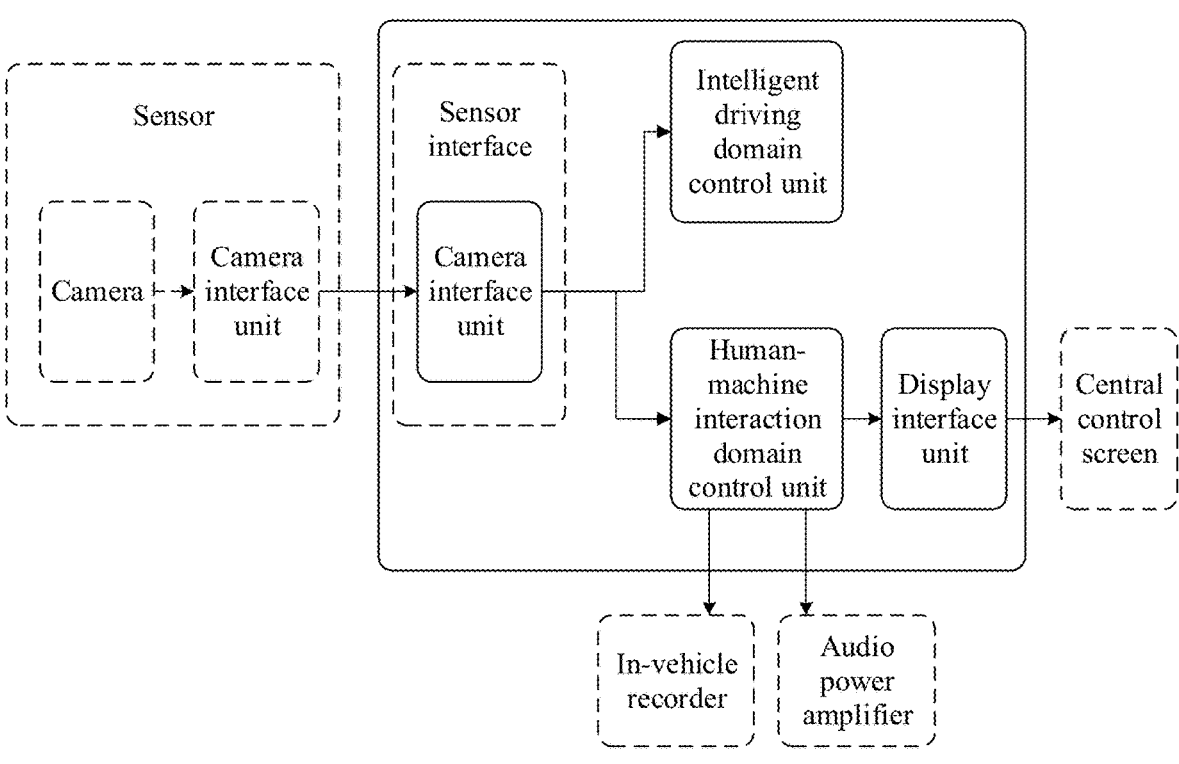
FIG. 10B is a schematic diagram of a system startup method according to an embodiment of this application.

Another embodiment of this application provides a system startup method, and the method is applied to the foregoing controller system. In this embodiment, an example in which a sensor interface unit is a camera interface unit and a sensor is a camera is used for description. As shown in a flowchart of FIG. 10A and a schematic diagram shown in FIG. 10B, the method includes the following operations.

S310: Power-on initialization: includes initialization performed by an intelligent driving domain control unit and a human-machine interaction domain control unit separately. When the intelligent driving domain control unit performs initialization, because a function safety monitoring mechanism exits, an initialization speed of the intelligent driving domain control unit is lower than a speed at which the human-machine interaction domain control unit performs initialization. Therefore, the human-machine interaction domain control unit first completes initialization and enters a working state.

S320: After the initialization performed by the human-machine interaction domain control unit is completed, receive a synchronization signal or a control signal of the human-machine interaction domain control unit through the camera interface unit, and send the synchronization signal or the control signal to the camera, to enable a surround view mode. For this process, refer to the control method applied to the surround view mode, and details are not described again.

It should be noted that, when the initialization of the intelligent driving domain control unit is not yet completed, configuration and startup of another camera and camera interface unit that are irrelevant to the surround view mode may be performed by the intelligent driving domain control unit after the intelligent driving domain control unit completes the initialization.

S330: After the initialization performed by the intelligent driving domain control unit is completed, receive a synchronization signal or a control signal of the intelligent driving domain control unit through the camera interface unit, send the synchronization signal or the control signal to the camera, and take over control of the camera interface unit or the camera based on the foregoing priority reason.

The foregoing startup method may be applied to a normal startup scenario of a vehicle, so that in powered-on startup of the vehicle, a surround view mode is first quickly enabled, and then when the vehicle is normal after being powered on, an intelligent driving domain control unit with a high safety level takes over control of the camera interface unit and the camera. Switchover based on the foregoing priority control and takeover is implemented, to ensure high safety.

Another embodiment of this application provides a control method. For some specific implementations of operations, or technical problems that can be resolved or corresponding effects, refer to the foregoing embodiment of the domain control system. Only brief description is provided herein. As shown in a schematic diagram shown in FIG. 11 or FIG. 10B, the control method includes the following operations.

S410: Receive data of a sensor through a sensor interface unit.

In some embodiments, the sensor interface unit and the sensor may be a camera interface unit and a camera, to collect video data outside a vehicle. For other optional embodiments, refer to the foregoing embodiment of the domain control system, and details are not described again.

S420: Transmit the data of the sensor to an intelligent driving domain control unit and a human-machine interaction domain control unit.

The intelligent driving domain control unit may make an intelligent driving decision based on the received data, for example, the video data or other received data. The human-machine interaction domain control unit may perform a human-machine interaction-related function based on the received data, for example, the video data or other received data, performing, for example, displaying (for example, in a surround view mode) by using a display screen, face detection (in a sentry mode), and the like.

In some embodiments, as shown in FIG. 12, the method further includes the following operation:

S510: Separately receive, by using two groups of interfaces of the sensor interface unit, a synchronization signal or a control signal transmitted by the intelligent driving domain control unit and the human-machine interaction domain control unit.

S520: The sensor interface unit selects one of the intelligent driving domain control unit and the human-machine interaction domain control unit to transmit the synchronization signal or the control signal to the sensor, where the synchronization signal is used as a trigger signal of the sensor or a frame rate control signal of the sensor for video capture, and the control signal is used for configuration of the sensor or data reading.

In some embodiments, the selecting one of the intelligent driving domain control unit and the human-machine interaction domain control unit includes: After receiving the synchronization signal or the control signal of the intelligent driving domain control unit, the sensor interface unit selects to transmit the synchronization signal or the control signal of the intelligent driving domain control unit.

In some embodiments, the method further includes: enabling the synchronization signal transmitted by the intelligent driving domain control unit to be time-synchronized with the synchronization signal transmitted by the human-machine interaction domain control unit.

In some embodiments, the method further includes:

generating, by using the intelligent driving domain control unit, content displayed by using an instrument display unit; and transmitting, by using a first display interface unit, the generated content displayed by using an instrument display unit to an instrument display unit for displaying.

In some embodiments, the method further includes:

generating, by using the human-machine interaction domain control unit, content displayed by using a display screen; and transmitting, by using a second display interface unit, the generated content displayed by using a display screen to a display screen for displaying.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

It should be noted that the foregoing is merely example embodiments and technical principles of this application. A person skilled in the art understands that the present application is not limited to the specific embodiments described herein, and a person skilled in the art can make various obvious changes, readjustments, and replacements without departing from the protection scope of the present application. Therefore, although this application is described in detail by using the foregoing embodiments, the present application is not limited to the foregoing embodiments, and more other equivalent embodiments may be included without departing from the concept of the present application, which all fall within the protection scope of the present application.

What is claimed is:

1. A controller system, comprising:
an intelligent driving domain control unit;
a human-machine interaction domain control unit; and a sensor interface unit, connected to the intelligent driving domain control unit and the human-machine interaction domain control unit respectively through two groups of interfaces, wherein the sensor interface unit is connected to a sensor and configured to transmit data of the sensor to the intelligent driving domain control unit and the human-machine interaction domain control unit, wherein a speed at which the intelligent driving domain control unit performs initialization is lower than a speed at which the human-machine interaction domain control unit performs initialization.

2. The system according to claim 1, wherein a signal transmitted by each group of interfaces of the two groups of interfaces comprises at least one of a synchronization signal, a control signal, or a video data stream signal; and wherein the synchronization signal is used as a trigger signal of the sensor or a frame rate control signal of the sensor for video capture, and wherein the control signal is used for configuration of the sensor or data reading.

3. The system according to claim 2, wherein
the sensor interface unit selects one of the intelligent driving domain control unit or the human-machine interaction domain control unit that is connected to the sensor interface unit to transmit at least one of the synchronization signal or the control signal.

4. The system according to claim 3, wherein the selection is based on at least one of the following factors:
priorities or safety levels of the intelligent driving domain control unit, priorities or safety levels of the human-machine interaction domain control unit, a running mode of the controller system, or a running status of the controller system.

5. The system according to claim 3, wherein the synchronization signal transmitted by the intelligent driving domain control unit is time-synchronized with the synchronization signal transmitted by the human-machine interaction domain control unit.

6. The system according to claim 1, further comprising at least one of:
a first display interface unit connected to the intelligent driving domain control unit, wherein the first display interface unit is connected to an instrument display unit; or
a second display interface unit connected to the human-machine interaction domain control unit, wherein the second display interface unit is connected to a display screen.

7. The system according to claim 1, further comprising:
a network switching unit connected to the intelligent driving domain control unit and the human-machine interaction domain control unit.

8. The system according to claim 7, further comprising: a third domain control unit connected to the network switching unit, wherein the third domain control unit is connected to one of: a chassis system control unit, a power system control unit, or a vehicle body system control unit; and wherein the third domain control unit is configured to:
collect information from a connected control unit; and
send the collected information to the intelligent driving domain control unit by using the network switching unit.

9. The system according to claim 7, wherein the network switching unit is further configured to connect to at least one of:
a laser radar sensor, a millimeter-wave radar sensor, an event data recorder, an internet of vehicles communication box, or an in-vehicle recorder.

10. The system according to claim 8, wherein the intelligent driving domain control unit is configured to implement an assisted driving or autonomous driving function, some functions of vehicle control, or some functions of vehicle body control;

wherein the third domain control unit is configured to implement a chassis system control function, a power system control function, other functions of the vehicle control, or other functions of the vehicle body control; and wherein the human-machine interaction domain control unit is configured to implement an entertainment domain application function or a human-machine user interface function.

11. The system according to claim 1, wherein:

the sensor interface unit is configured to receive data of the sensor;

wherein the human-machine interaction domain control unit is further configured perform human proximity detection or intrusion detection based on the data of the sensor, and send the data of the sensor to an in-vehicle recorder by using a network switching unit.

12. The system according to claim 11, wherein the human-machine interaction domain control unit is further configured to:

generate alert data when an exception is detected; and send the alert data to an audio device for playing, or send the alert data to a display screen for displaying.

13. The system according to claim 1, wherein:

the sensor interface unit is further configured to receive data of the sensor;

wherein the human-machine interaction domain control unit is further configured to perform image processing based on the data of the sensor, to generate surround view image data, and send the surround view image data to a display screen for displaying.

14. The system according to claim 1, wherein the human-machine interaction domain control unit is further configured to receive a synchronization signal or a control signal of the human-machine interaction domain control unit through the sensor interface unit, and send the synchronization signal or the control signal to the sensor, to enable a surround view mode;

wherein the intelligent driving domain control unit is further configured to receive a synchronization signal or a control signal of the intelligent driving domain control unit through the sensor interface unit, and send the synchronization signal or the control signal to the sensor, to take over control on the sensor interface unit or the sensor.

15. A vehicle, comprising:

at least one sensor; and a controller system, wherein the controller system comprises an intelligent driving domain control unit, a human-machine interaction domain control unit, and a sensor interface unit connected to the at least one sensor; wherein:

the sensor interface unit is connected to the intelligent driving domain control unit and the human-machine interaction domain control unit respectively through two groups of interfaces; and wherein the sensor interface unit is configured to transmit data of the sensor to the intelligent driving domain control unit and the human-machine interaction domain control unit, wherein a speed at which the intelligent driving domain control unit performs initialization is lower than a speed at which the human-machine interaction domain control unit performs initialization.

16. The vehicle according to claim 15, wherein:

the sensor interface unit is further configured to receive data from a sensor of the at least one sensor;

wherein the human-machine interaction domain control unit is further configured perform human proximity detection or intrusion detection based on the data of the sensor, and send the data of the sensor to an in-vehicle recorder.

17. The vehicle according to claim 16, wherein the human-machine interaction domain control unit is further configured to:

generate alert data when an exception is detected; and send the alert data to an audio device for playing, or send the alert data to a display screen for displaying.

18. The vehicle according to claim 15, wherein the at least one sensor comprises a surround view camera, wherein:

the sensor interface unit is further configured to receive data of the surround view camera;

wherein the human-machine interaction domain control unit is further configured to perform image processing based on the data of the surround view camera, to generate surround view image data, and send the surround view image data to a display screen for displaying.

19. The vehicle according to claim 15, wherein the human-machine interaction domain control unit is further configured to receive a synchronization signal or a control signal of the human-machine interaction domain control unit through the sensor interface unit, and send the synchronization signal or the control signal to the surround view camera, to enable a surround view mode;

wherein the intelligent driving domain control unit is further configured to receive a synchronization signal or a control signal of the intelligent driving domain control unit through the sensor interface unit, and send the synchronization signal or the control signal to the sensor, to take over control on the sensor interface unit or the surround view camera.

20. The vehicle according to claim 15, wherein the control system further comprises a third domain control unit and a network switching unit, wherein the third domain control unit is configured to:

collect information from one of: a chassis system control unit, a power system control unit, or a vehicle body system control unit; and send the collected information to the intelligent driving domain control unit by using the network switching unit.

\* \* \* \* \*